(12) United States Patent
Kagota et al.

(10) Patent No.: US 9,358,704 B2
(45) Date of Patent: Jun. 7, 2016

(54) SPOKE CASTING DEVICE OF AIRLESS TIRE

(71) Applicant: SUMITOMO RUBBER INDUSTRIES LTD., Kobe (JP)

(72) Inventors: Hirotoshi Kagota, Kobe (JP); Wako Iwamura, Kobe (JP); Makoto Sugiya, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 0 days.

(21) Appl. No.: 14/729,458

(22) Filed: Jun. 3, 2015

(65) Prior Publication Data

US 2015/0352755 A1     Dec. 10, 2015

(30) Foreign Application Priority Data

Jun. 9, 2014 (JP) .................................. 2014-118912

(51) Int. Cl.
| | |
|---|---|
| *B29D 30/02* | (2006.01) |
| *B29C 43/02* | (2006.01) |
| *B29L 30/00* | (2006.01) |
| *B29C 33/12* | (2006.01) |
| *B29C 45/14* | (2006.01) |
| *B60C 7/12* | (2006.01) |

(52) U.S. Cl.
CPC .............. *B29C 43/027* (2013.01); *B29D 30/02* (2013.01); *B29C 33/123* (2013.01); *B29C 45/14065* (2013.01); *B29L 2030/006* (2013.01); *B60C 7/125* (2013.01); *B60C 2007/005* (2013.04)

(58) Field of Classification Search
CPC ...... B29D 30/02; B29C 33/12; B29C 33/123; B29C 43/027; B29C 45/14065
See application file for complete search history.

(56) References Cited

U.S. PATENT DOCUMENTS

| | | | |
|---|---|---|---|
| 7,650,919 B2 * | 1/2010 | Rhyne ....................... | B60C 7/18 152/11 |
| 8,636,490 B1 * | 1/2014 | Martin .................... | B29C 33/42 425/170 |

FOREIGN PATENT DOCUMENTS

JP      2008-260514 A    10/2008

* cited by examiner

*Primary Examiner* — James Mackey
(74) *Attorney, Agent, or Firm* — Oblon, McClelland, Maier & Neustadt, L.L.P.

(57) ABSTRACT

A spoke casting device for integrally cast-molding a spoke of an airless tire includes a casting mold including upper and lower molds which relatively moves between mold closed and mold open states in tire axial direction, a positioning device which concentrically positions a hub and a tread ring with respect to the cast mold, and a demolding device which pushes out an airless tire from the lower mold in the open state. The cast mold concentrically holds the ring and hub between the upper and lower molds and forms a cavity for casting a spoke made of a polymer material between the ring and hub held in the closed state, and the positioning device includes a first positioning device including an outer peripheral surface contact portion such that the contact portion makes contact with outer peripheral surface of the ring and positions the ring with respect to the cast mold.

20 Claims, 9 Drawing Sheets

SPOKE CASTING DEVICE OF AIRLESS TIRE

CROSS-REFERENCE TO RELATED APPLICATIONS

The present application is based upon and claims the benefit of priority to Japanese Patent Application No. 2014-118912, filed Jun. 9, 2014, the entire contents of which are incorporated herein by reference.

BACKGROUND OF THE INVENTION

1. Field of the Invention

The present invention relates to a casting device for integrally cast-molding a spoke with a tread ring and a hub in an airless tire in which the tread ring and the hub are connected by the spoke made of a polymer material.

2. Description of Background Art

An airless tire may have a structure in which a cylindrical tread ring having a ground contact surface and a hub fixed on an axle are connected by a spoke that includes spoke plate portions (see Japanese Patent Laid-Open Publication No. 2008-260514). The entire contents of this publication are incorporated herein by reference.

SUMMARY OF THE INVENTION

According to one aspect of the present invention, a spoke casting device for integrally cast-molding a spoke of an airless tire includes a casting mold including an upper mold and a lower mold which relatively moves between a mold closed state and a mold open state in a tire axial direction, a positioning device which concentrically positions a hub and a tread ring with respect to the cast mold, and a demolding device which pushes out an airless tire from the lower mold in the mold open state. The cast mold concentrically holds the tread ring and the hub between the upper and lower molds and forms a cavity for casting a spoke made of a polymer material between the tread ring and the hub held in the mold closed state, and the positioning device includes a first positioning device including an outer peripheral surface contact portion such that the outer peripheral surface contact portion makes contact with an outer peripheral surface of the tread ring and positions the tread ring with respect to the cast mold.

According to another aspect of the present invention, a spoke casting device for integrally cast-molding a spoke of an airless tire includes a casting mold including an upper mold and a lower mold which relatively moves between a mold closed state and a mold open state in a tire axial direction, positioning means for concentrically positioning a hub and a tread ring with respect to the cast mold, and demolding means for pushing out an airless tire from the lower mold in the mold open state. The cast mold concentrically holds the tread ring and the hub between the upper and lower molds and forms a cavity for casting a spoke made of a polymer material between the tread ring and the hub held in the mold closed state, and the positioning means includes first positioning means including an outer peripheral surface contact portion which makes contact with an outer peripheral surface of the tread ring and positions the tread ring with respect to the cast mold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 7:
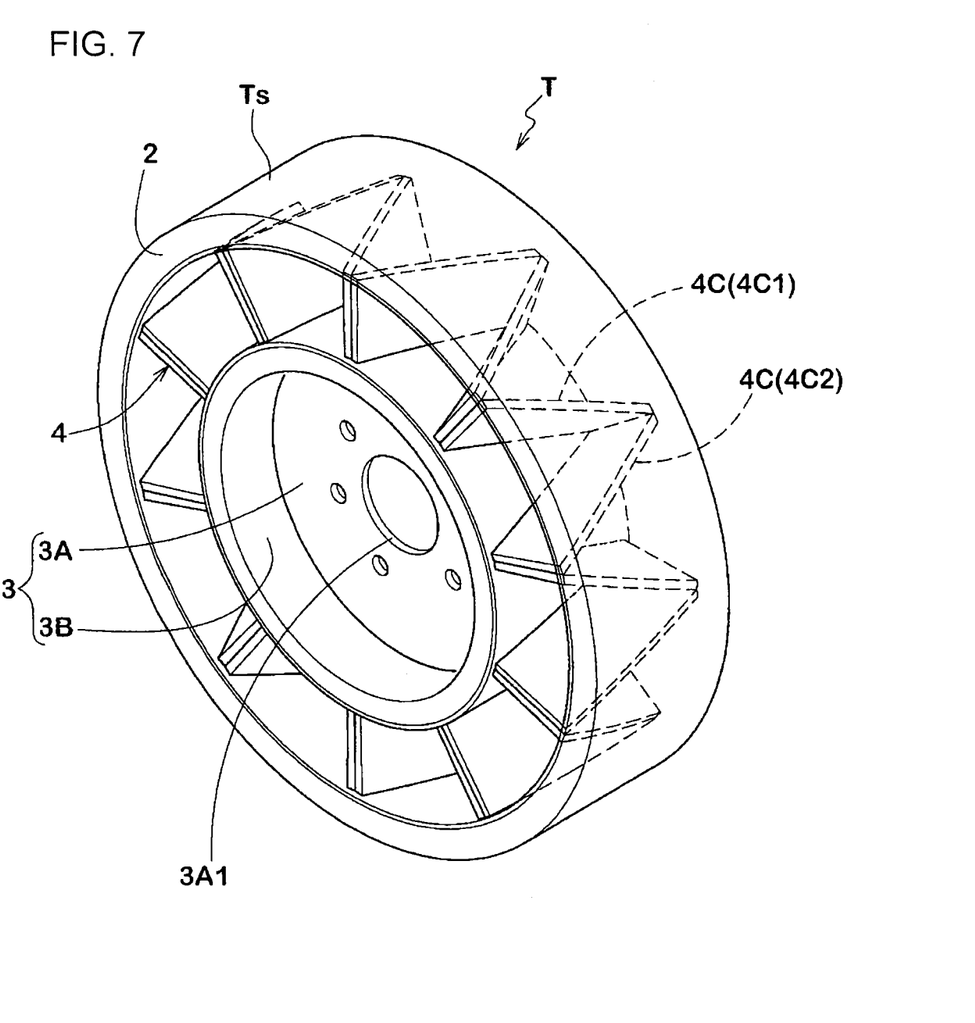
FIG. 7 is a perspective view illustrating an example of the airless tire that is cast-molded using the spoke casting device.
Figure 8:
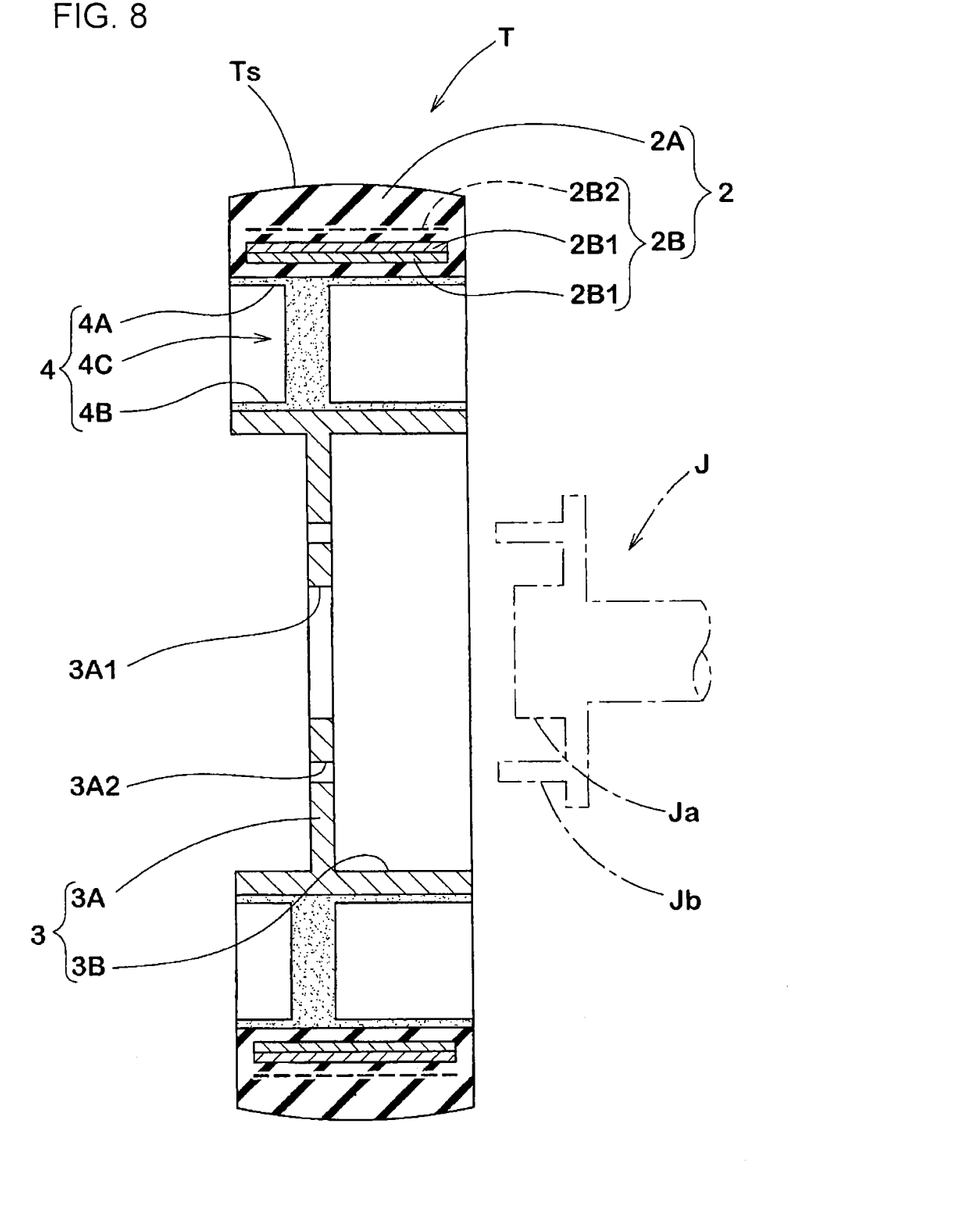
FIG. 8 is a cross-sectional view of the example illustrated in FIG. 7.

FIGS. 7 and 8 illustrate an example of an airless tire (T) cast-molded using a spoke casting device 1 according to an embodiment of the present invention. The airless tire (T) includes a cylindrical tread ring 2 that has a ground contact surface (Ts), a hub 3 that is arranged on a radial direction inner side of the tread ring 2 and is fixed to an axle (J), and a spoke 4 that is made of a polymer material and connects the tread ring 2 and the hub 3. The present example illustrates a case where the airless tire (T) is formed as a passenger car tire.

The tread ring 2 is a part corresponding to a tread part of a pneumatic tire, and includes a tread rubber part (2A) and a reinforcing cord layer (2B) that is embedded inside the tread rubber part (2A). As the tread rubber part (2A), a rubber composition that is superior in frictional force and wear resistance with respect to making contact with the ground is preferably adopted. Further, as the reinforcing cord layer (2B), a belt ply (2B1) in which tire cords are arranged at an angle of, for example, 10-45 degrees with respect to a circumferential direction of the tire and a band ply (2B2) in which tire cords are spirally wound in the circumferential direction of the tire can be adopted as appropriate.

Such a tread ring 2 is separately formed by sequentially winding a sheet-like member for forming the reinforcing cord layer (2B) and a sheet-like member for forming the tread rubber part (2A) on a cylindrical drum in a circumferential direction to form a raw tread ring in advance and thereafter vulcanization molding the raw tread ring in a vulcanization mold.

The hub 3 corresponds to a tire wheel and, in the present example, includes disk-shaped disk part (3A) that is fixed to the axle (J) and a cylindrical spoke attaching part (3B) that is integrally formed on a radial direction outer end part of the disk part (3A). At a center of the disk part (3A), a hub hole (3A1) to which a front end part (Ja) of the axle (J) is inserted is formed. Further, around the hub hole (3A1), bolt insertion holes (3A2) are provided for fixing, with nuts, bolt parts (Jb) that are provided on the axle side.

Similar to a conventional tire wheel, such a hub 3 is separately formed using a metal material such as steel, aluminum alloy or magnesium alloy.

The spoke 4 is a cast-molded body made of a polymer material and, in the present example, is formed to include an outer annular part (4A), an inner annular part (4B) and spoke plate parts (4C) that are radially arranged and connect between the outer annular part (4A) and the inner annular part (4B). As the polymer material, thermoset resin such as epoxy resin, phenolic resin, polyurethane resin or melamine resin is preferably adopted. In particular, the polyurethane resin has excellent elastic properties and thus is more preferably adopted.

The outer annular part (4A) and the inner annular part (4B) are each a cylindrical body concentric with the axle (J) and are respectively bonded to an inner peripheral surface of the tread ring 2 and an outer peripheral surface of the hub 3 by integral molding. The spoke plate parts (4C) of the present example include first spoke plate parts (4C1) that are inclined toward one side with respect to a tire axial direction and second spoke plate parts (4C2) that are inclined toward the other side. The first and second spoke plate parts (4C1, 4C2) are alternately arranged in the circumferential direction of the tire. In the present example, a case is illustrated where the first and second spoke plate parts (4C1, 4C2) are continuously arranged in a zigzag pattern. However, it is also possible that the first and second spoke plate parts (4C1, 4C2) are not continuously arranged.

Such a spoke 4 is integrally cast-molded with the tread ring 2 and hub 3 using the spoke casting device 1 according to an embodiment of the present invention.

Figure 1:
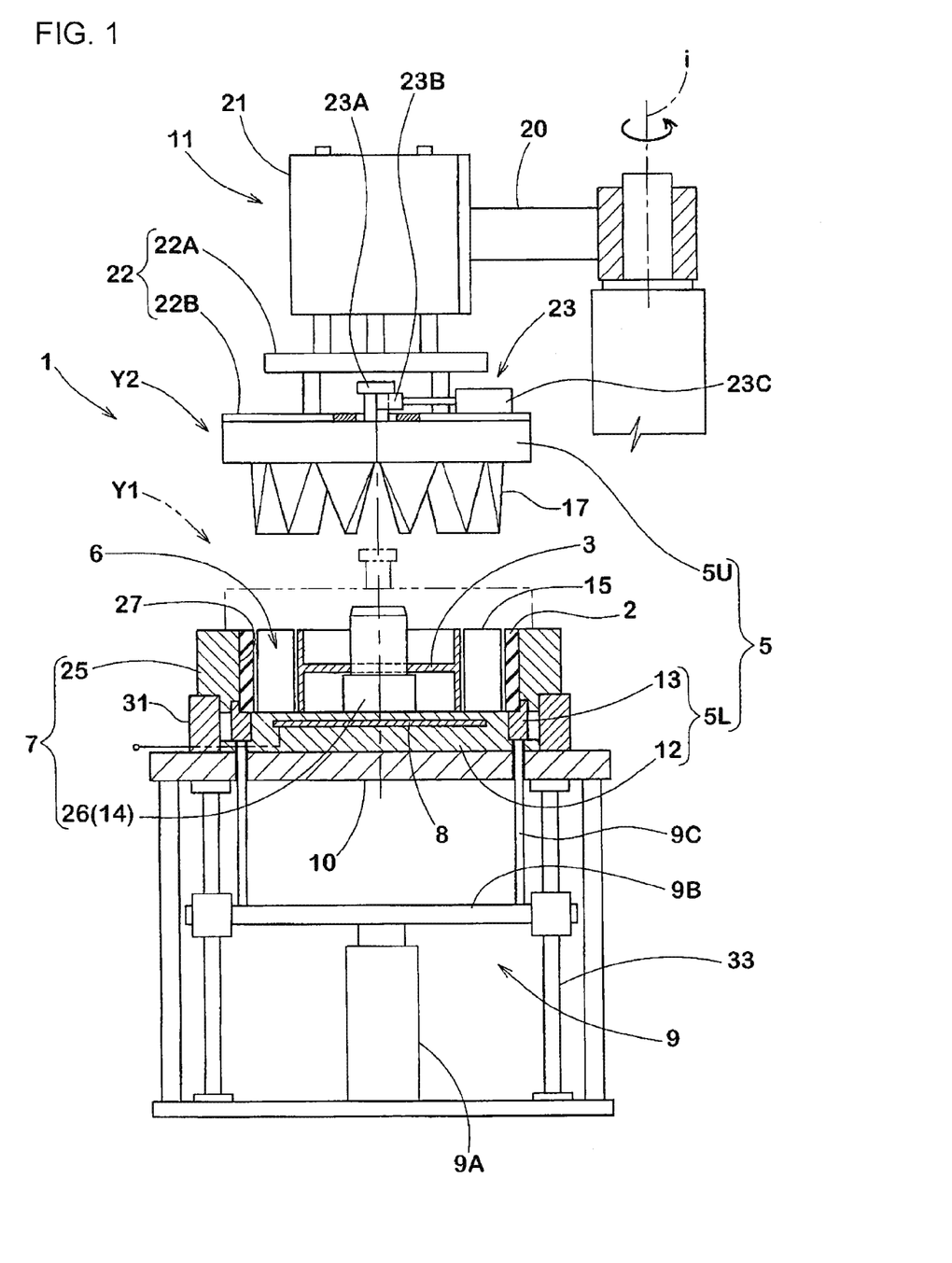
FIG. 1 is a front view illustrating an example of a spoke casting device of an airless tire of the present invention.
Figure 2:
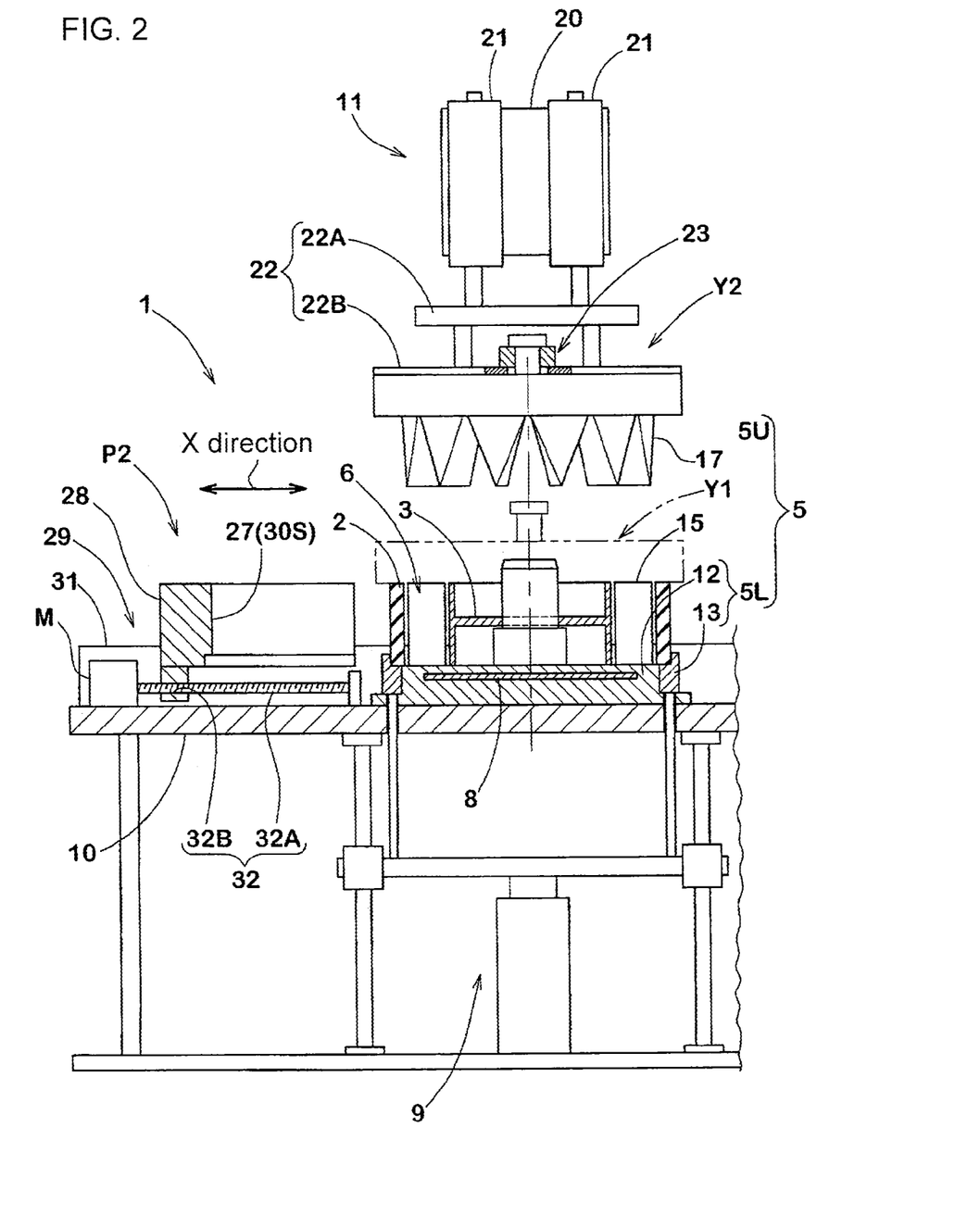
FIG. 2 is a side view of the example illustrated in FIG. 1.

As illustrated in FIGS. 1 and 2, the spoke casting device 1 of the present embodiment includes (a) a casting mold 5 that has upper and lower molds (5U, 5L) and forms a cavity 6 for spoke casting; (b) a positioning means 7 that concentrically positions the tread ring 2 and the hub 3; and (c) a demolding means 9 that pushes out the airless tire 1 after cast molding from the lower mold (5L) in a mold open state (Y2).

The casting mold 5 has the upper and lower molds (5U, 5L) that can relatively move in the tire axial direction between a mold closed state (Y1) and the mold open state (Y2). In the present example, the lower mold (5L) is fixed on a table-like support frame 10, and the upper mold (5U) is vertically movably supported by a lifting and lowering device 11.

Figure 3:
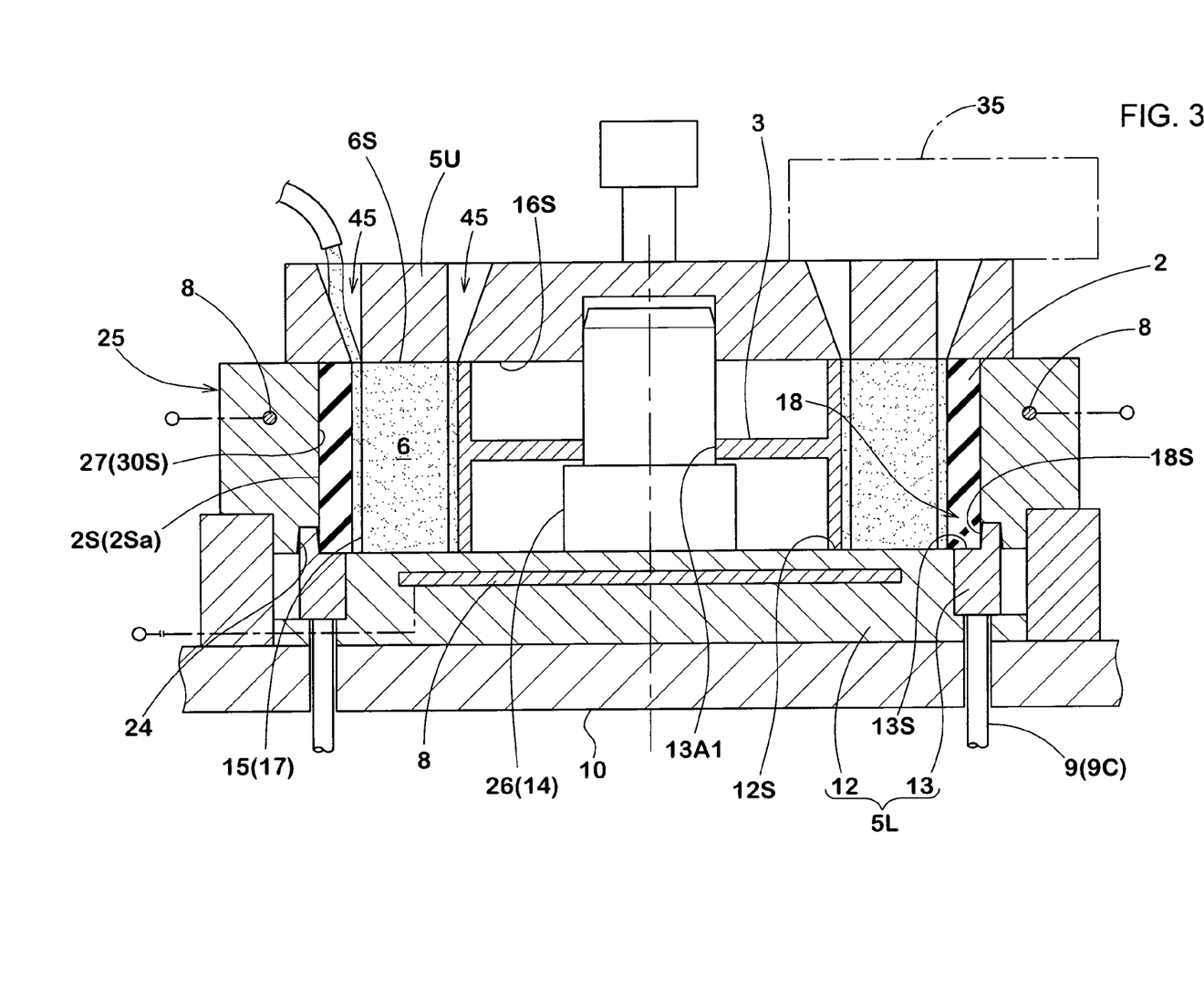
FIG. 3 is a cross-sectional view illustrating a casting mold in a mold closed state.

As illustrated in FIG. 3, the lower mold (5L) of the present example includes a first lower mold 12 and a second lower mold 13, the first lower mold 12 having a receiving surface (12S) that receives a lower end of the hub 3, and the second lower mold 13 having a receiving surface (13S) that receives a lower end of the tread ring 2.

The first lower mold 12 is fixed on the support frame 10. Further, the first lower mold 12 has an upper surface that forms the receiving surface (12S), and has a positioning pin 14 that positions the hub 3 by being inserted into the hub hole (3A1) of the hub 3 and fins 15 (illustrated in FIG. 5) for forming the spoke plate parts (4C), the positioning pin 14 and the fins 15 being provided on the upper surface in projecting manners.

The second lower mold 13 is formed in an annular shape, and is concentrically arranged on a radial direction outer side of the first lower mold 12 and is vertically movably supported by the demolding means 9. A cutout part 18 that has a rectangular cross section and supports a lower end part of the tread ring 2 is provided on an upper end of the second mold 13. A bottom surface of the cutout part 18 forms the receiving surface (13S). Further, a side surface (18S) of the cutout part 18 rises in a small height from the receiving surface (13S), performs temporary positioning when the tread ring 2 is put in the lower mold (5L) and performs displacement prevention and drop prevention when the airless tire after cast molding is pushed out from the lower mold (5L).

The upper mold (5U) forms a disk-like shape in the present example. A lower surface (16S) of the upper mold (5U) forms a receiving surface that receives an upper end of the hub 3 and an upper end of the tread ring 2. Further, fins 17 (illustrated in FIGS. 1 and 2) for forming the spoke plate parts (4C) are provided in a projecting manner on the lower surface (16S).

As illustrated in FIGS. 1 and 2, in the present example, the lifting and lowering device 11 that vertically movably supports the upper mold (5U) includes: an arm 20 that is supported in such a manner that one end of the arm 20 is rotatable about a vertical axis (i); a pair of cylinders 21, for example, that are attached to the other end of the arm 20; and a lifting and lowering table 22 that is attached to lower ends of rods of the cylinders 21. The upper mold (5U) is detachably connected to the lifting and lowering table 22 via a detaching means 23. The lifting and lowering table 22 of the present example includes a pair of lifting and lowering tables (22A, 22B) that are vertically separated by a spacer.

Further, the detaching means 23 includes: a pin (23A) that is provided in a projecting manner on an upper surface of the upper mold (5U); a clamp bracket (23B) that detachably engages the pin (23A); and a back-and-forth mover (23C) that is, for example, a cylinder that can horizontally move the clamp bracket (23B) back and forth between an engaging position and a detaching position. The pin (23A) has a large-diameter head part on an upper end of a small-diameter trunk part. The clamp bracket (23B) has a semicircular cutout hole that can retain the head part by engaging with the trunk part. An insertion hole that allows the pin (23A) to penetrate through is formed in the lower lifting and lowering table (22B), and the back-and-forth mover (23C) is fixed on an upper surface of the lower lifting and lowering table (22B).

In the mold closed state (Y1) in which the upper mold (5U) is lowered, such a casting mold 5 can hold the tread ring 2 and the hub 3 by sandwiching the tread ring 2 and the hub 3 between the upper and lower molds (5U, 5L). Further, the cavity 6 for casting the spoke is formed between the tread ring 2 and the hub 3, which are held by the casting mold 5.

Figure 4:
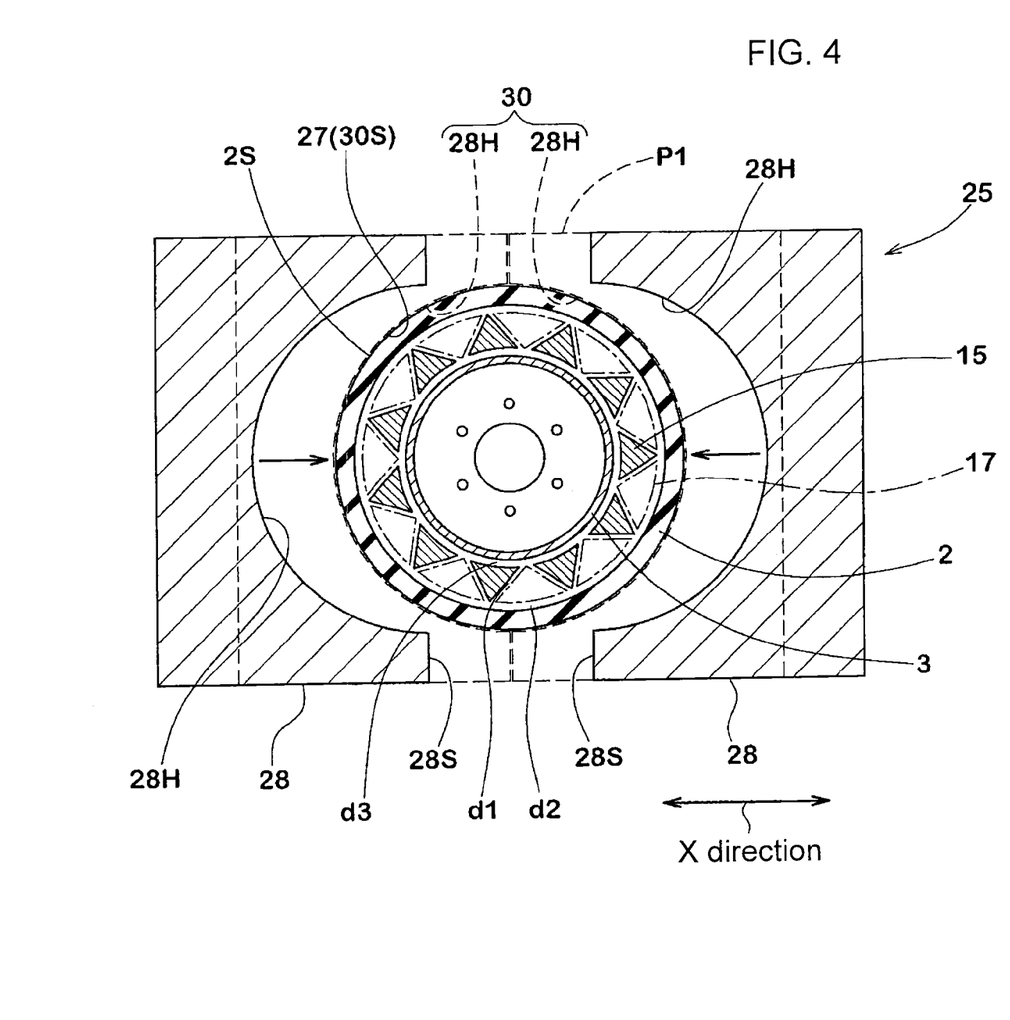
FIG. 4 is cross-sectional view conceptually illustrating main parts of a first positioning means.

The fins (15, 17) for forming the spoke plate parts (4C) are each formed in a shape of a triangular prism in the present example and are arranged in the cavity 6. As a result, as illustrated in FIG. 4, the cavity 6 is partitioned into a cavity portion (d1) that is arranged between adjacent fins (15, 17) in the circumferential direction for casting the spoke plate parts (4C), a cavity portion (d2) that is arranged between a radial direction outer surface of the fins (15, 17) and the inner peripheral surface of the tread ring 2 for casting the outer annular part (4A), and a cavity portion (d3) that is arranged between a radial direction inner surface of the fins (15, 17) and the outer peripheral surface of the hub 3 for casting the inner annular part (4B). The cavity portions (d1-d3) are mutually communicatively connected.

Next, as illustrated in FIGS. 1 and 3, the positioning means 7 includes a first positioning means 25 that positions the tread ring 2 and a second positioning means 26 that positions the hub 3. The second positioning means 26 of the present example is formed by the positioning pin 14.

Further, the first positioning means 25 includes an outer peripheral surface contact part 27 that positions the tread ring 2 by being in contact with an outer peripheral surface (2S) of the tread ring 2.

Figure 5:
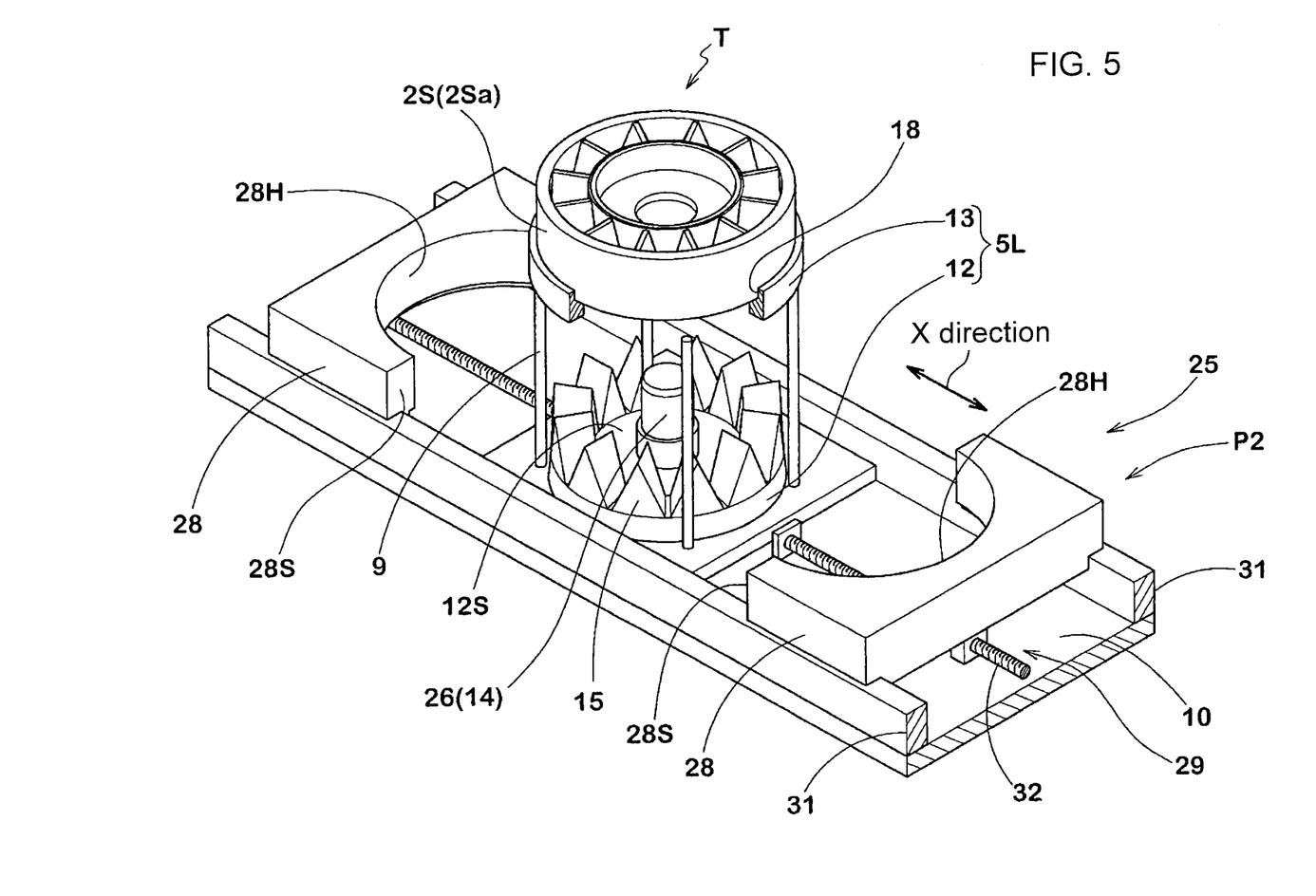
FIG. 5 is a perspective view illustrating a state in which the airless tire after cast molding is pushed out.

As illustrated in FIGS. 4 and 5, the first positioning means 25 of the present example includes a pair of half block-shaped positioning pieces 28 in which semicircular cutout hole parts (28H) are respectively provided in opposing surfaces (28S), and a movement means 29 capable of moving the positioning pieces 28 in an X direction in which the opposing surfaces (28S) are brought into contact with or separated away from each other. At a forward position (P1) (illustrated in FIG. 4) at which the opposing surfaces (28S) are in contact with each other, the cutout hole parts (28H, 28H) together form a circular hole 30, and an inner peripheral surface (30S) of the circular hole 30 is in contact with the outer peripheral surface (2S) of the tread ring 2. Thereby, the positioning pieces 28 concentrically position the tread ring 2.

Therefore, in the present example, the inner peripheral surface (30S) forms the outer peripheral surface contact part 27. It is preferable that the outer peripheral surface contact part 27 be in contact with the outer peripheral surface (2S) over an entire circumference of the outer peripheral surface (2S). Further, it is preferable that the outer peripheral surface contact part 27 be in contact with a substantially entire surface of the outer peripheral surface (2S). The "substantially entire surface" means 90% or more of a total area of the outer peripheral surface (2S). The outer peripheral surface contact part 27 of the present example is in contact with a surface portion (2Sa) of the outer peripheral surface (2S), the surface portion (2Sa) protruding upward from the second lower mold 13. An area of the surface portion (2Sa) is 90% or more of the total area. The side surface (18S) provided in the second lower mold 13 can also be a contact surface that is in contact with the outer peripheral surface (2S) of the tread ring 2. In this case, the inner peripheral surface (30S) and the side surface (18S) form the outer peripheral surface contact part 27 that is in contact with the entire surface of the outer peripheral surface (2S).

Cutout parts 24 (illustrated in FIG. 3) for avoiding collision with the second lower mold 13 at the forward position (P1) are respectively formed at lower end parts of the cutout hole parts (28H) in the positioning pieces 28 of the present example.

As illustrated in FIGS. 2 and 5, the movement means 29 includes a pair of guides 31 that guide the positioning pieces 28 in the X direction, and a mover 32 that moves positioning pieces 28 (that are guided by the guides 31) in the X direction. The guides 31 are provided on the support frame 10. The mover 32 in the present example includes a ball screw shaft (32A) in the X direction that is rotationally driven by a motor (M), and nut holes (32B) that are provided in the positioning pieces 28 and are screwed to the ball screw shaft (32A).

The first positioning means 25 operates in the mold open state (Y2) and after the tread ring 2 is put on the lower mold (5L). Then, by moving the positioning pieces 28 from a standby position (P2) to the forward position (P1), the outer peripheral surface contact part 27 is in contact with the outer peripheral surface (2S) of the tread ring 2 and the tread ring 2 is concentrically positioned with good accuracy. In this case, even when a tread ring as a single body has low circularity, the tread ring can be positioned while its circularity is corrected. Therefore, circularity and concentricity of the tread ring 2 during cast molding can be improved.

In the spoke casting device 1 of the present example, a heating means 8 is arranged that thermally cures a polymer material that is injected into the cavity 6 by heating the polymer material. The heating means 8 of the present example is a so-called electric heater and is arranged in at least one of the upper mold (5U), the lower mold (5L), the positioning pieces 28 and the support frame 10. In the present example, as illustrated in FIG. 3, a case is illustrated where the heating means 8 is embedded in the lower mold (5L) and the positioning pieces 28. The casting mold 5 is heated by the heating means 8 to a curing temperature of the polymer material. As the heating means 8, steam or the like may also be adopted.

Figure 6:
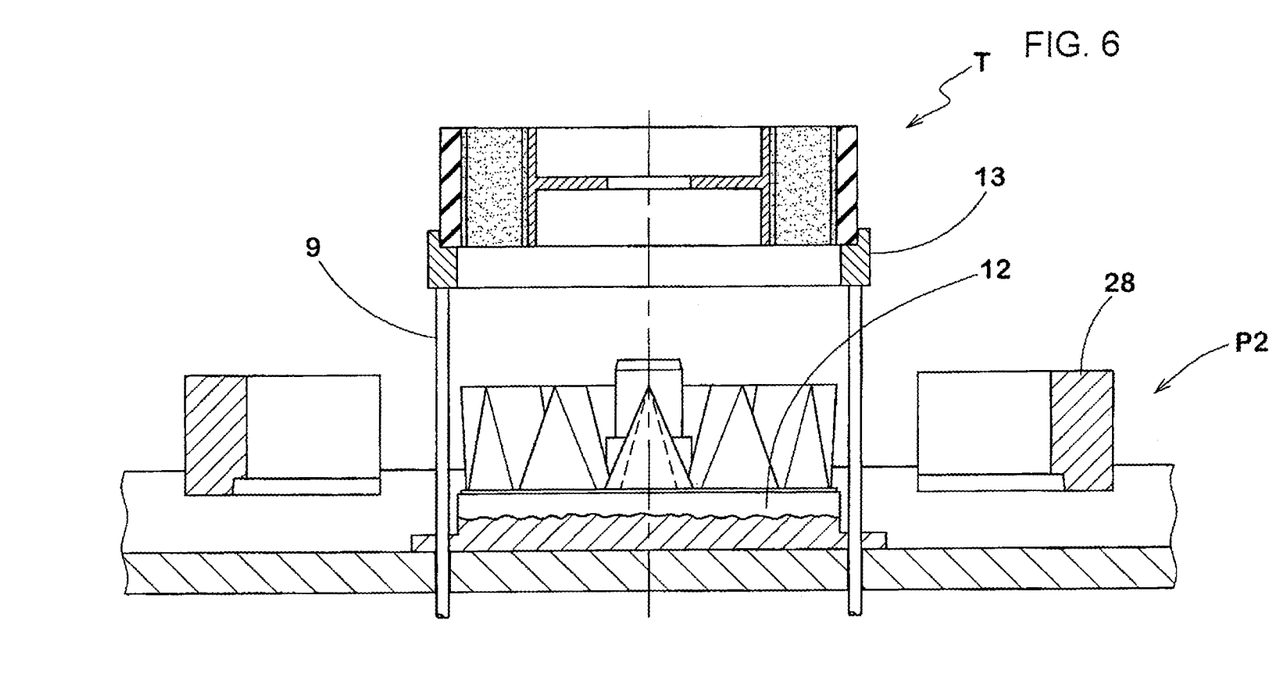
FIG. 6 is a partial cross-sectional view of the state illustrated in FIG. 5.

Next, in the mold open state (Y2), the demolding means 9 pushes out the airless tire (T) after cast molding from the lower mold (5L). As illustrated in FIG. 1, the demolding means 9 of the present example includes: a cylinder (9A); a lifting and lowering plate (9B) that is attached to an end of a rod of the cylinder (9A) and is vertically movable; and push-out shafts (9C) that rise from the lifting and lowering plate (9B) and to upper ends of which the second lower mold 13 is attached. As illustrated in FIGS. 5 and 6, by lifting the airless tire 1 together with the second lower mold 13, the airless tire (T) can be taken out from the first lower mold 12. Prior to the pushing out by the demolding means 9, the positioning pieces 28 are retracted to the standby position (P2). Thereby, a force for the pushing out can be reduced and deformation due to rubbing between the airless tire 1 and the mold can be prevented. A reference numeral 33 in FIG. 1 indicates a guide shaft that vertically guides the lifting and lowering plate (9B).

Further, the spoke casting device 1 of the present example includes a vibration generator 35 (illustrated in FIG. 3) causes the casting mold 5 to vibrate to discharge air bubbles in the polymer material when the polymer material is injected into the cavity 6. The vibration generator 35 is a so-called vibrator and, in the present example, is detachably attached to the upper mold (5U) that has been detached from the lifting and lowering device 11 by the detaching means 23.

In order to quickly discharge air bubbles adhering to walls of the cavity 6, it is preferable that vibration having amplitude of 0.02-0.5 mm and a frequency of 30 Hz or more be generated by the vibration generator 35. When the amplitude is less than 0.02 mm and the frequency is less than 30 Hz, the effect of discharging air bubbles cannot be sufficiently achieved. Further, when the amplitude exceeds 0.5 mm, positional displacement is likely to occur in the tread ring 2 and the hub 3 and formation accuracy of the tire is reduced. Therefore, it is preferable to set 0.1 mm or more as a lower limit and 0.3 mm or less as an upper limit for the amplitude. From a viewpoint of the effect of discharging air bubbles, it is preferable that the frequency be 50 Hz or more.

Further, in order to discharge air bubbles in the polymer material, as illustrated in FIG. 3, it is preferable that an upper surface (6S) of the cavity 6 be inclined at an angle ($\alpha$) (not illustrated in the drawings) with respect to a horizontal plane. As a result, it becomes easy for the air bubbles to flow and to be removed. The angle ($\alpha$) is preferably 2-10 degrees. When the angle ($\alpha$) is less than 2 degrees, the above-described effect cannot be sufficiently achieved. On the other hand, when the angle ($\alpha$) is more than 10 degrees, quality and uniformity of the airless tire (T) tend to decrease. Therefore it is preferable that a lower limit of the angle ($\alpha$) be 3 degrees or more and an upper limit be 7 degrees or less. A reference numeral 45 in FIG. 3 indicates an opening for injecting the polymer material into the cavity 6 and for removing surfaced air bubbles.

Figure 9:
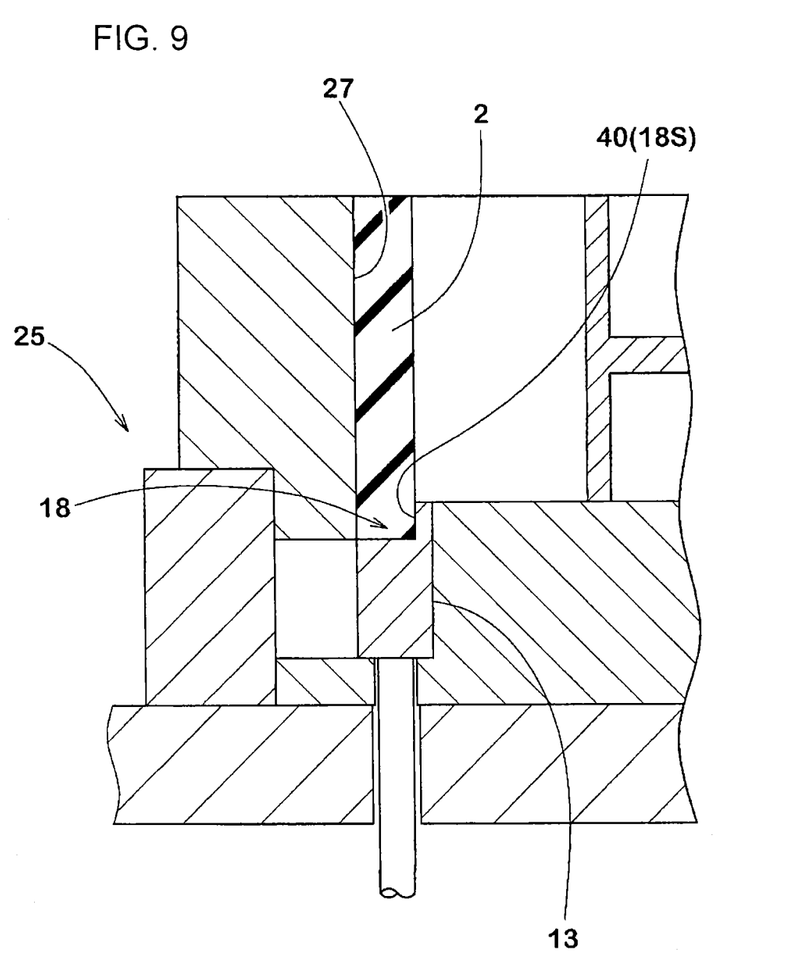
FIG. 9 is partial cross-sectional view conceptually illustrating another example of the first positioning means.

FIG. 9 illustrates another example of the first positioning means 25. In the present example, in addition to the outer peripheral surface contact part 27, the first positioning means 25 further includes an inner peripheral surface contact part 40 that is in contact with a portion of the inner peripheral surface of the tread ring 2. In the present example, for example, the side surface (18S) of the cutout part 18 that is provided in the second lower mold 13 forms the inner peripheral surface contact part 40. The inner peripheral surface contact part 40 auxiliarily positions the tread ring 2.

In the above, the particularly preferred embodiments of the present invention are described in detail. However, the present invention is not limited by the embodiments illustrated in the drawings, but can be carried out in various modified forms.

EXAMPLES

In order to confirm the effects according to an embodiment of the present invention, airless tires (corresponding to a tire size of 145/70R12) (in each of which the spoke was integrally cast-molded with the tread ring and the hub) for passenger cars were experimentally produced using the spoke casting device illustrated in FIG. 1 based on specifications listed in Table 1. Then, tests were performed regarding uniformity, vibration characteristics, appearance (trace of air bubbles) and durability for each of the experimentally produced tires.

Substantially identical tread rings and hubs were used for the tires. Further, casting molds also have substantially identical configurations. Polyurethane resin (thermosetting resin) is used for the spokes.

The first positioning means in each of Example 1-15 positions the tread ring 2 using the outer peripheral surface contact part 27 of the pair of the positioning pieces (28, 28) as illustrated in FIG. 3. Further, in Example 16, as illustrated in FIG. 9, the tread ring 2 is positioned by the inner peripheral surface contact part 40 of the side surface (18S) of the cutout part 18 provided in the second lower mold 13 and by the outer peripheral surface contact part 27 of the pair of the positioning pieces (28, 28). Further, in Comparative Example 1, in FIG. 9, the tread ring 2 is positioned by only the inner peripheral surface contact part 40 of the side surface (18S) of the cutout part 18 provided in the second lower mold 13. The outer peripheral surface contact part 27 is not provided.

(1) Uniformity:

Using a non-contact laser measuring device, RRO (radial run-out) was measured on a tire equator of a tire tread and at a shoulder portion (at a position 20 mm away from a tread edge on a tire axial direction inner side), and the measured values were averaged.

(2) Vibration Characteristics:

The experimentally produced tires were mounted to four wheels of a vehicle (an ultra-small type EV; product name: CMOS) for running on a tire test course with a dry asphalt road surface. Vibration performance was evaluated using a four-point method based on sensory evaluation of a driver.

4—Vibration is not felt.
3—Vibration is felt, but is at an acceptable level that does cause any problem on a market.
2—Vibration is felt, and is at a level that may cause complaints from some users.
1—Large vibration is felt, and is at a level that may cause complaints from almost all users.

(3) Appearance: (Trace of Air Bubbles)

Trace of air bubbles in the spoke was evaluated using a four-point method based on sensory evaluation by visual inspection of an inspector.

4—There is no race of large air bubbles.
3—Trace of small air bubbles slightly remains.
2—Trace of large air bubbles and trace of small air bubbles both slightly remain.
1—Trace of air bubbles and trace of air bubbles both greatly remain.

(4) Durability:

A drum testing machine was used and the experimentally produced tires were run on the drum at a load of 1.17 kN and a speed of 40 km/h. For each of the tires, a distance traveled until a failure occurred in the tire is presented as an index value with the value of Example 5 as 100. A larger index value indicates superior durability.

TABLE 1

| | Comparative example 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|
| First positioning means | | | | | | | | | | | |
| Presence or absence of outer peripheral surface contact part | No | | | | | Yes | | | | | |
| (Percentage of contact area *1) | — | (50%) | | | | | (90%) | | | | |
| Presence or absence of inner peripheral surface contact part | Yes | | | | | No | | | | | |
| (Percentage of contact area *2) | (5%) | | | | | | — | | | | |
| Presence or absence of vibration generator | | No | | Yes | No | | | Yes | | | |
| Amplitude | | — | | 0.2 | — | 0.2 | 0.01 | 0.02 | 0.5 | 0.7 | 0.2 |
| Frequency | | — | | 50 | — | | | 50 | | | 10 |
| Angle α (degree) of cavity upper surface | | 0 | | | | 5 | | | 0 | | |
| Uniformity average RRO (mm) | 2.5 | 1.2 | 0.8 | 0.8 | 0.8 | 0.6 | 0.6 | 0.6 | 0.7 | 1.5 | 0.6 |
| Vibration characteristics | 1 | 4 | 4 | 4 | 4 | 4 | 4 | 4 | 4 | 3 | 4 |
| Appearance quality | 1 | 2 | 2 | 3 | 3 | 4 | 2 | 2 | 4 | 4 | 2 |
| Durability | 5 | 15 | 18 | 35 | 40 | 100 | 20 | 30 | 80 | 90 | 20 |

| | Example 11 | Example 12 | Example 13 | Example 14 | Example 15 | Example 16 |
|---|---|---|---|---|---|---|
| First positioning means | | | | | | |
| Presence or absence of outer peripheral surface contact part | | | | Yes | | |
| (Percentage of contact area *1) | | | | (90%) | | |
| Presence or absence of inner peripheral surface contact part | | | No | | | Yes |
| (Percentage of contact area *2) | | | — | | | (5%) |
| Presence or absence of vibration generator | Yes | | | No | | |
| Amplitude | 0.2 | | | — | | |
| Frequency | 30 | | | — | | |
| Angle α (degree) of cavity upper surface | 0 | 1 | 3 | 10 | 15 | 0 |

TABLE 1-continued

| | | | | | | |
|---|---|---|---|---|---|---|
| Uniformity average RRO (mm) | 0.6 | 0.6 | 0.6 | 0.6 | 0.6 | 0.8 |
| Vibration characteristics | 4 | 4 | 4 | 4 | 4 | 4 |
| Appearance quality | 3 | 2 | 3 | 4 | 4 | 2 |
| Durability | 35 | 20 | 30 | 17 | 7 | 18 |

*1) Expressed as a percentage (%) of a contact area by the outer peripheral surface contact part with respect to the entire area of the outer peripheral surface of the tread ring.
*2) Expressed as a percentage (%) of a contact area by the inner peripheral surface contact part with respect to the entire area of the inner peripheral surface of the tread ring.

In the examples, the tread ring is positioned using the outer peripheral surface contact part. Therefore, it can be confirmed that the uniformity (RRO) can be improved.

In Japanese Patent Laid-Open Publication No. 2008-260514, it is suggested that the spoke is integrally molded with the tread ring and the hub in the airless tire.

On the other hand, when the integral molding is performed, positioning the tread ring and the hub in a casting mold with high accuracy is important. However, a surface of the tread ring is formed of rubber. Therefore, the surface is easily deformed by an external force that is applied when the tread ring is positioned and fixed. As a result, problems occur such as that circularity of the tread ring is impaired and that concentricity is reduced causing decrease in uniformity of the tire.

Positioning may be performed by providing annular projections in upper and lower molds, the annular projections being in contact with an inner peripheral surface of the tread ring. However, the inner peripheral surface of the tread ring forms a cavity for spoke casting and thus it is difficult to secure a contact surface having a sufficient height. As a result, positioning accuracy is insufficient and it is difficult to sufficiently improve the circularity and concentricity of the tread ring. Further, there is also a risk that, when the mold is closed, one of the annular projections that are provided in the upper and lower molds poorly fits with the inner peripheral surface of the tread ring.

A spoke casting device of an airless tire according to an embodiment of the present invention has a first positioning means that includes an outer peripheral surface contact part that positions a tread ring by being in contact with an outer peripheral surface of the tread ring, allows the tread ring to be positioned with high accuracy without causing poor fitting when a mold is closed, and allows circularity and concentricity of the tread ring to be improved to improve uniformity of the tire.

A spoke casting device according to an embodiment of present invention is for an airless tire. The airless tire includes a cylindrical tread ring that has a ground contact surface, a hub that is arranged on a radial direction inner side of the tread ring and is fixed to an axle, and a spoke that is made of a polymer material and connects the tread ring and the hub. The casting device is for integrally cast-molding the spoke with the tread ring and the hub, and includes: a casting mold that has upper and lower molds that can relatively move in a tire axial direction between a mold closed state and a mold open state, and, in the mold closed state, concentrically holds the tread ring and the hub between the upper and lower molds and forms a cavity for casting the spoke between the tread ring and the hub that are held; a positioning means that concentrically positions the hub and the tread ring; and a demolding means that pushes out the airless tire after cast molding from the lower mold in the mold open state. The positioning means has a first positioning means that includes an outer peripheral surface contact part that positions the tread ring by being in contact with an outer peripheral surface of the tread ring.

In a spoke casting device for an airless tire according to an embodiment of the present invention, it is preferable that the outer peripheral surface contact part be in contact with substantially the entire outer peripheral surface of the tread ring.

In a spoke casting device of the airless tire according to an embodiment of the present invention, it is preferable that the first positioning means include an inner peripheral surface contact part that is in contact with a portion of an inner peripheral surface of the tread ring.

In a spoke casting device of the airless tire according to an embodiment of the present invention, it is preferable to include a vibration generator that causes the casting mold to vibrate to discharge air bubbles in a polymer material when the polymer material is injected in the cavity.

In a spoke casting device of the airless tire according to an embodiment of the present invention, it is preferable that the vibration generator generate vibration having an amplitude of 0.02-0.5 mm and a frequency of 30 Hz or more.

In a spoke casting device of the airless tire according to an embodiment of the present invention, it is preferable that an upper surface of the cavity is inclined at an angle ($\alpha$) with respect to a horizontal plane.

In a spoke casting device of the airless tire according to an embodiment of the present invention, it is preferable that the angle ($\alpha$) be 2-10 degrees.

In an embodiment of the present invention, as described above, the positioning means that concentrically positions the hub and the tread ring has the first positioning means that includes the outer peripheral surface contact part that positions the tread ring by being in contact with the outer peripheral surface of the tread ring.

The outer peripheral surface of the tread ring does not form the cavity for casting the spoke. Therefore, a height of a contact surface between the tread ring and the first positioning means can be sufficiently secured and the positioning accuracy can be improved. Further, the first positioning means presses against the tread ring in a manner wrapping around the entire circumference of the tread ring. Therefore, even when a force is applied to the tread ring, deformation in a diameter-reducing direction of the tread ring hardly occurs. Further, even when the tread ring as a single body has low circularity, the tread ring can be positioned while its circularity is corrected. As a result, the circularity and the concentricity of the tread ring during cast molding can be improved and the uniformity of the tire can be improved.

Further, by dividing the outer peripheral surface contact part into two parts, for example, the first positioning means can be moved toward or away from the tread ring (move inward or outward in the radial direction). Therefore, poor fitting when the mold is closed can be prevented. Further, by moving the first positioning means away from the tread ring after cast molding, a resistance force when the airless tire is pushed out from the mold can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A spoke casting device for integrally cast-molding a spoke of an airless tire, comprising:
   a casting mold comprising an upper mold and a lower mold which are configured to relatively move between a mold closed state and a mold open state in a tire axial direction;
   a positioning device configured to concentrically position a hub and a tread ring with respect to the casting mold; and
   a demolding device configured to push out an airless tire from the lower mold in the mold open state,
   wherein the casting mold is configured to concentrically hold the tread ring and the hub between the upper and lower molds and form a cavity for casting a spoke made of a polymer material between the tread ring and the hub held in the mold closed state, and the positioning device comprises a first positioning device including an outer peripheral surface contact portion such that the outer peripheral surface contact portion is configured to contact with an outer peripheral surface of the tread ring and positions the tread ring with respect to the casting mold.

2. The spoke casting device of the airless tire according to claim 1, wherein the outer peripheral surface contact portion is configured to make contact with substantially an entire portion of the outer peripheral surface of the tread ring.

3. The spoke casting device of the airless tire according to claim 1, wherein the first positioning device includes an inner peripheral surface contact portion configured to make contact with a portion of an inner peripheral surface of the tread ring.

4. The spoke casting device of the airless tire according to claim 1, further comprising:
   a vibration generator configured to vibrate the casting mold such that air bubbles in the polymer material is discharged when the polymer material is injected into the cavity.

5. The spoke casting device of the airless tire according to claim 4, wherein the vibration generator is configured to generate vibration having amplitude in a range of 0.02 to 0.5 mm and a frequency in a range of 30 Hz or more.

6. The spoke casting device of the airless tire according to claim 1, wherein the casting mold is configured to form the cavity such that an upper surface of the cavity is inclined at an angle $\alpha$ with respect to a horizontal plane.

7. The spoke casting device of the airless tire according to claim 6, wherein the casting mold is configured to form the cavity such that the upper surface of the cavity is inclined at the angle $\alpha$ in a range of 2 to 10 degrees with respect to the horizontal plane.

8. The spoke casting device of the airless tire according to claim 2, wherein the first positioning device includes an inner peripheral surface contact portion configured to make contact with a portion of an inner peripheral surface of the tread ring.

9. The spoke casting device of the airless tire according to claim 2, further comprising:
   a vibration generator configured to vibrate the casting mold such that air bubbles in the polymer material is discharged when the polymer material is injected into the cavity.

10. The spoke casting device of the airless tire according to claim 9, wherein the vibration generator is configured to generate vibration having amplitude in a range of 0.02 to 0.5 mm and a frequency in a range of 30 Hz or more.

11. The spoke casting device of the airless tire according to claim 2, wherein the casting mold is configured to form the cavity such that an upper surface of the cavity is inclined at an angle $\alpha$ with respect to a horizontal plane.

12. The spoke casting device of the airless tire according to claim 11, wherein the casting mold is configured to form the cavity such that the upper surface of the cavity is inclined at the angle $\alpha$ in a range of 2 to 10 degrees with respect to the horizontal plane.

13. The spoke casting device of the airless tire according to claim 3, further comprising:
   a vibration generator configured to vibrate the casting mold such that air bubbles in the polymer material is discharged when the polymer material is injected into the cavity.

14. The spoke casting device of the airless tire according to claim 13, wherein the vibration generator is configured to generate vibration having amplitude in a range of 0.02 to 0.5 mm and a frequency in a range of 30 Hz or more.

15. The spoke casting device of the airless tire according to claim 3, wherein the casting mold is configured to form the cavity such that an upper surface of the cavity is inclined at an angle $\alpha$ with respect to a horizontal plane.

16. The spoke casting device of the airless tire according to claim 15, wherein the casting mold is configured to form the cavity such that the upper surface of the cavity is inclined at the angle $\alpha$ in a range of 2 to 10 degrees with respect to the horizontal plane.

17. The spoke casting device of the airless tire according to claim 4, wherein the casting mold is configured to form the cavity such that an upper surface of the cavity is inclined at an angle $\alpha$ with respect to a horizontal plane.

18. The spoke casting device of the airless tire according to claim 17, wherein the casting mold is configured to form the cavity such that the upper surface of the cavity is inclined at the angle $\alpha$ in a range of 2 to 10 degrees with respect to the horizontal plane.

19. A spoke casting device for integrally cast-molding a spoke of an airless tire, comprising:
   a casting mold comprising an upper mold and a lower mold which are configured to relatively move between a mold closed state and a mold open state in a tire axial direction;
   positioning means for concentrically positioning a hub and a tread ring with respect to the casting mold; and
   demolding means for pushing out an airless tire from the lower mold in the mold open state,
   wherein the casting mold is configured to concentrically hold the tread ring and the hub between the upper and lower molds and form a cavity for casting a spoke made of a polymer material between the tread ring and the hub held in the mold closed state, and the positioning means includes first positioning means including an outer peripheral surface contact portion which makes contact with an outer peripheral surface of the tread ring and positions the tread ring with respect to the casting mold.

20. The spoke casting device of the airless tire according to claim 19, wherein the outer peripheral surface contact portion makes contact with substantially an entire portion of the outer peripheral surface of the tread ring.

* * * * *